United States Patent [19]
Eshraghi

[11] Patent Number: 5,429,464
[45] Date of Patent: Jul. 4, 1995

[54] BLIND FASTENER WITH TWO-PIECE EXPANDER

[75] Inventor: Soheil A. Eshraghi, Irvine, Calif.

[73] Assignee: Textron Inc., Providence, R.I.

[21] Appl. No.: 195,691

[22] Filed: Feb. 16, 1994

[51] Int. Cl.[6] ............... F16B 13/04; F16B 13/06; B21K 1/44
[52] U.S. Cl. ........................... 411/43; 411/70; 470/30
[58] Field of Search ............... 411/40, 41, 43, 69, 411/70; 470/28–30

[56] References Cited

U.S. PATENT DOCUMENTS

| | | |
|---|---|---|
| 2,061,629 | 11/1936 | Huck . |
| 2,114,493 | 4/1938 | Huck . |
| 2,372,222 | 3/1945 | Mullgardt . |
| 2,466,811 | 4/1949 | Huck . |
| 3,148,578 | 9/1964 | Gapp . |
| 3,288,016 | 11/1966 | Reynolds . |
| 3,292,482 | 12/1966 | Fry et al. . |
| 3,302,510 | 2/1967 | Gapp . |
| 3,377,907 | 4/1968 | Hurd . |
| 3,390,601 | 7/1968 | Summerlin . |
| 3,489,056 | 1/1970 | Blakeley . |
| 3,491,649 | 1/1970 | Smouton et al. . |
| 4,012,984 | 3/1977 | Matuschek . |
| 4,137,817 | 2/1979 | Siebol . |
| 4,143,580 | 3/1979 | Luhm . |
| 4,230,017 | 10/1980 | Angelosanto . |
| 4,407,619 | 10/1983 | Siebol . |
| 4,451,189 | 5/1984 | Pratt . |
| 4,627,775 | 12/1986 | Dickson . |
| 4,765,787 | 8/1988 | Briles . |
| 4,810,142 | 3/1989 | Briles . |
| 4,897,004 | 1/1990 | Norton . |
| 4,936,725 | 6/1990 | Eshraghi . |
| 5,052,870 | 10/1991 | Pratt et al. . |
| 5,056,973 | 10/1991 | Pratt et al. . |
| 5,131,107 | 7/1992 | Pratt et al. . |
| 5,252,014 | 10/1993 | Andrews . |

*Primary Examiner*—Neill R. Wilson
*Attorney, Agent, or Firm*—Knobbe, Martens, Olson & Bear

[57] ABSTRACT

A blind fastener which comprises a fastener body, a stem and a two-piece shear/expander assembly. The assembly includes an anchor section sized to fit within an annular groove in a neck portion of the stem and an expander collar which surrounds the shear ring. When the fastener is installed, a bulbing portion of the expander collar upsets the tail end of the fastener until an inner shoulder of the collar step causes an outer section of the ring to shear from the anchor section. A lock ring groove is formed in the stem midsection of smaller diameter at the intersections of the stem neck and midsection. The shear ring may be formed of shaped wire which is wrapped around the fastener stem, while the expander collar is an annular element next to the shear ring. The shear ring dimensions and material properties can be modified to alter the fastener characteristics.

17 Claims, 2 Drawing Sheets

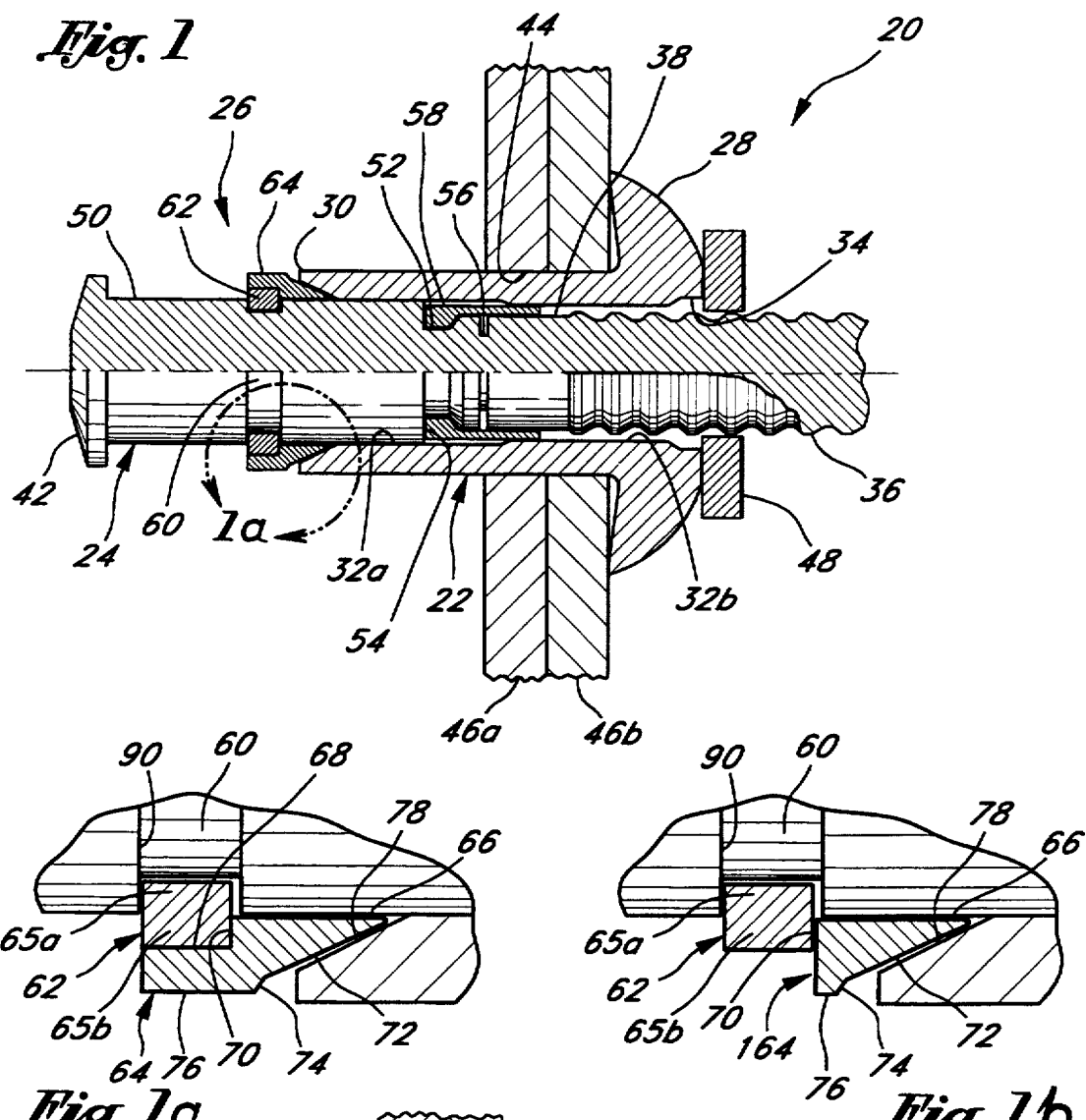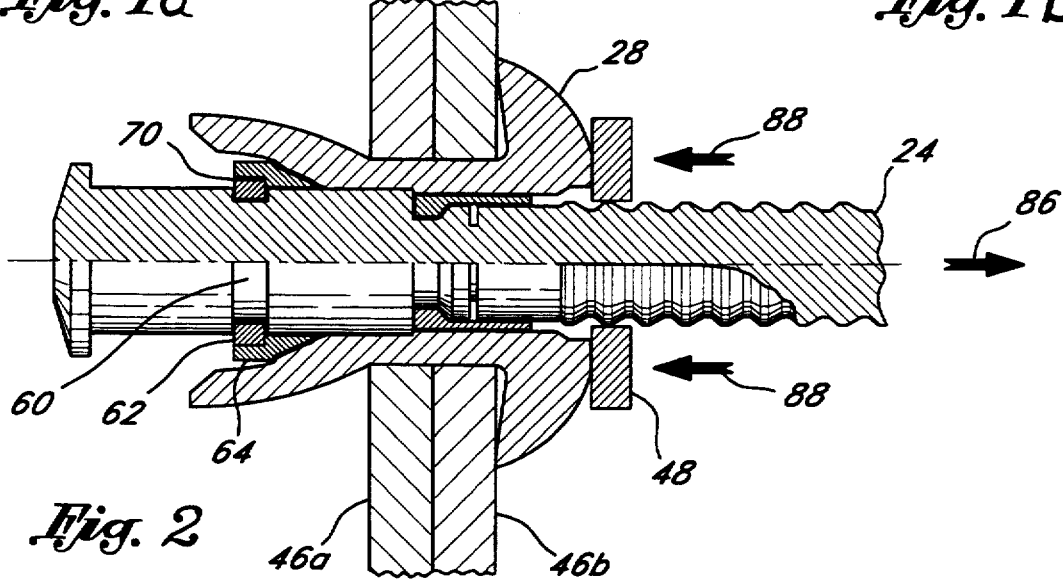

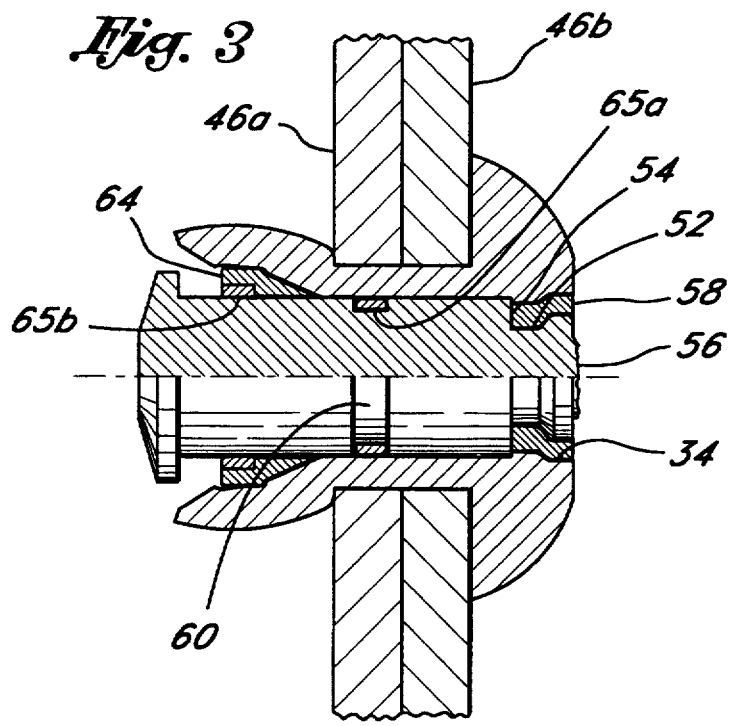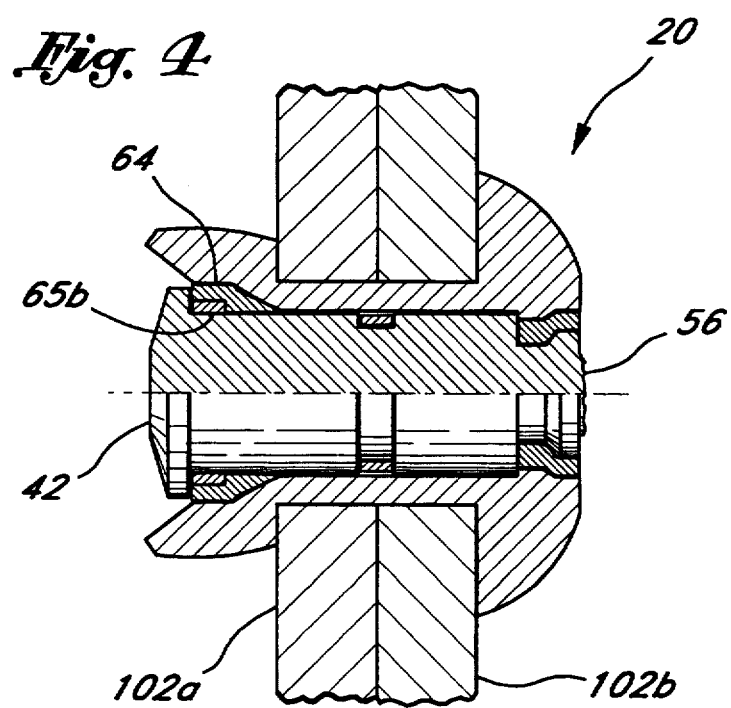

BLIND FASTENER WITH TWO-PIECE EXPANDER

FIELD OF THE INVENTION

The present invention relates generally to blind fasteners and, more particularly, to a fastener wherein the blind tail of the fastener sleeve is expanded outwardly to secure the tail of the fastener.

BACKGROUND OF THE INVENTION

Blind fasteners, or rivets, as well known in the art, are utilized in fastening components in which only one side of the workpiece is accessible. U.S. Pat. No. 3,148,578 to Gapp describes a fastener assembly comprising a fastener body in the form of a sleeve, and an elongated stem within the fastener body. One end of the stem has serrations for engagement by a pulling tool. The opposite end of the stem has an upsetting head. Adjacent the tail end of the sleeve is a shear ring, integrally formed with the stem.

In operation the Gapp assembly is inserted through aligned holes in juxtaposed workpieces to be secured together. Once fully inserted, a tool is used to pull the stem axially away from the workpiece, while a reactionary force is applied against a head of the sleeve. During this first part of the pulling operation, the shear ring causes radial expansion of the tail end of the sleeve and bulbing on the blind side of the workpieces. The shear ring is constructed to shear from the stem at a predetermined tension on the stem, thereby limiting the amount of clamping compression on the workpieces to a predetermined value. Continued pulling causes a lock ring groove in the stem to reach the sleeve head where a lock ring is deformed into the groove. Pulling increases the load, causing the stem extending beyond the accessible face of the workpieces to break away.

Shear rings integrally formed with the mandrel stem suffer from many manufacturing disadvantages. For example, cutting tools are typically used to form a shear ring in a blank of material. Such machining is not only time consuming, but also produces a large amount of scrap. Furthermore, as the cutting tools are used they become dull and worn, and slight variations in the dimensions of the shear ring tend to appear. Other manufacturing processes such as heading or coining are possible, but it is difficult to hold adequate tolerances so that consistent shearing loads are obtained.

A blind fastener utilizing a separate shear ring is shown in U.S. Pat. Nos. 5,052,870, 5,056,973, and 5,131,107 issued to Pratt. These patents disclose a blind fastener having an elongated stem with an enlarged blind end adjacent a cylindrical neck, with an annular groove machined in the neck. A tubular fastener body receives the stem with the neck fitting closely within a tail end of the body. An anchor portion of a shear ring fits in the annular groove with a bulbing portion of the ring extending radially beyond the stem neck. When the blind end of the stem is drawn toward the fastener body, the bulbing portion of the shear ring forms a blind head on the fastener body; and when a predetermined stem pulling load is reached, the bulbing portion of the ring is sheared from the anchor portion.

Advantageously, the Pratt patents utilize a shear ring extruded as a shaped wire that is wrapped around the fastener stem, with the anchor portion fitting within the annular groove. Utilizing the extrusion process, the shaped wire can be formed relatively inexpensively with dependable tolerances; thus, there is less variation in the axial dimension of the shear ring, resulting in a very reliable prediction of the forces required to shear the ring. Because the shear ring is not integral with the stem, its composition is not limited to the material used to form the stem. This is particularly beneficial from a manufacturing standpoint in that a single lot of mandrel stems can be wrapped with any one of a number of precise shear ring wires to produce a wide variety of fasteners. Unfortunately, the process of wrapping a relatively large cross section shaped wire around the mandrel stem inevitably leads to a slight amount of springback of the wire. This springback results in a discontinuity in the shear ring around the mandrel stem, exposing sharp edges and possibly causing rupture of the bulbing tail of the fastener body. One solution to this problem is to band anneal the sleeve tail so there is less tendency to split; however, this adds a manufacturing step. Also, after a fastener has been installed with a split expander there can be some tendency for the sheared expander or bulbing portion to move rearwardly, enlarging its diameter and resulting in less holding force on the workpiece.

Thus, there exists a need for an improved shear ring for blind fasteners that will overcome the deficiencies of prior designs.

SUMMARY OF THE INVENTION

The present invention comprises an improved blind fastener having a fastener body or sleeve with a stem extending therethrough and a separate two piece shear/expander combination surrounding an enlarged neck of the stem. The stem neck is sized to fit snugly within a tail of the fastener body with the shear/expander assembly captured within an annular groove in the neck between the tail and a head of the stem. The fastener is inserted through aligned holes from a visible side of juxtaposed workpieces so that the stem head, shear/expander assembly and fastener body tail project from the blind side. The stem includes serrations on the visible end which are utilized to draw the stem in an axial direction toward the visible side of the workpieces while an equal and opposite reaction force is applied against a head of the fastener body. The annular groove in the stem urges the shear/expander combination against the fastener body tail bulbing the tail as the stem is drawn farther.

In accordance with one important aspect of the present invention, the shear/expander combination comprises two separate parts: an expander collar and a shear ring. An inner or anchor section of the shear ring is captured within the annular groove while an outer shear section extends radially outward from the neck portion. The expander collar bulbs the tail of the fastener body until further bulbing is prevented by the engagement of the blind side workpiece and the bulbed tail. Continued pulling of the stem causes the collar to shear the outer section of the ring from the anchor section captured in the annular groove. Following the shearing step, the stem is pulled farther to deform a lock ring into a lock groove prior to the stem being severed at a break groove.

In accordance with a preferred aspect of the present invention, the shear ring is manufactured as a shaped wire and then wrapped around the annular groove in the stem. The expander collar is preferably formed as a continuous annular member to fit against or over the shear ring and cover the discontinuous ends of the ring. Further, it is easier to wrap the smaller cross-sectioned shear ring of the present invention than the larger shear and expansion ring of the Pratt patents referred to above. There is also less springback. Additionally, the shear ring may be formed of various types of materials, all of which can be used with the same stem to provide fasteners with various shear characteristics, depending on the particular application. The shear ring may be wrapped completely around the annular groove or only partially wrapped around in order to vary its strength in shear. Further, the axial dimension of the annular groove may be such that shear rings having various axial dimensions can be installed to alter the fastener characteristics. Advantageously, the expander collar may be made of the material best suited for the tail expanding function.

BRIEF DESCRIPTION OF THE DRAWINGS

FIG. 1 is a partial cross-sectional side view of a blind fastener assembly of the present invention installed within aligned holes in juxtaposed workpieces;

FIG. 1a is a detail view of the shear/expander assembly of FIG. 1;

FIG. 1b illustrates an alternate form of a shear/expander combination, the view being analogous to that of FIG. 1a.

FIG. 2 is a partial cross-sectional side view of the blind fastener assembly of FIG. 1 during installation;

FIG. 3 is a partial cross-sectional side view of the blind fastener assembly of FIG. 1 fully installed; and FIG. 4 is a partial cross-sectional side view of the fully installed blind fastener assembly securing two thicker workpieces together.

DETAILED DESCRIPTION OF THE PREFERRED EMBODIMENTS

Referring to FIG. 1, a blind fastener assembly 20 comprises a tubular fastener body 22, a stem 24, and a two-piece shear/expander assembly 26. The fastener body 22 comprises a tubular sleeve having a head 28 at one end, a tail 30 at the opposite end, with the inner diameter of the sleeve tail being tapered or beveled. In the present embodiment, the sleeve has a bore 32 having a first diameter 32a adjacent the tail 30 and a second, slightly smaller diameter 32b that extends from near the midsection of the sleeve to the head 28 before opening into a larger diameter counterbore or recess 34.

The stem 24 is appreciably longer than the fastener body 22 and has serrations 36 along the end thereof extending from an unserrated midsection 38 through to the forward tip (not shown) of the stem to facilitate firm gripping of the fastener by a conventional installation tool (not shown). Opposite the forward tip of the stem 24 is an enlarged head 42.

FIG. 1 shows the stem 24 inserted through the bore 32 of the fastener body 22, with the entire assembly 20 inserted into aligned throughholes 44 in two workpieces 46a, 46b. In the present description, the right side of the assembly and workpieces is the forward or visible side, while the left side is to the rear, or to the blind side, of the assembly. The outer diameters of the stem head 42, shear/expander assembly 26, and fastener body 22 are generally aligned and sized small enough to fit through the throughholes 44 from the right side. Thus, the fastener 20 is preassembled and then inserted into the throughholes 44 from the right or visible side until the underside of the fastener body head 28 seats on the right-hand workpiece 46b. An anvil washer 48 or similar expedient is utilized in setting the fastener assembly 20 to secure the two workpieces 46 together, as will be described more fully below.

Adjacent the stem head 42 is an elongated neck 50, which is sized to fit closely within the first bore diameter 32a in the fastener body 22. In the form of the fastener illustrated in FIG. 1, the neck 50 extends to a length almost equal to the length of the fastener body 22. The forward end of the neck portion 50 terminates in an annular locking groove 52, wherein the forward end face of the neck forms a shoulder 54 as a result of the reduced diameter midsection 38 and serrated end 36. The locking groove 52 has an inner diameter that is slightly smaller than the stem midsection 38 but is, of course, slightly larger than the diameter of a break groove 56 slightly forward of the groove. It should be noted, however, that the locking groove 52 is recessed directly inwardly from the enlarged diameter of the neck 50 such that the inner diameter of the groove is as large as possible. Thus, it is only necessary that the break groove 56 be slightly smaller than the diameter of the locking groove 50, thereby maximizing the available pulling load that the stem 24 can accommodate. Moreover, the shear strength of the combination of the stem 24 and fastener body 22 in the installed fastener is maximized.

The locking groove 52 is sized to receive a lock ring 58 having an anchor or bead portion that fits into the locking groove and a forward portion surrounding the stem midsection 38 that extends between the enlarged neck 50 and the serrations 36 of the stem. Note that the forward portion of the lock ring 58 also surrounds the break groove 56.

In accordance with the present invention, an annular groove 60 is formed in the neck portion 52 at a location spaced forwardly from the stem head 42. As best seen in the detailed view of FIG. 1a, the shear/expander assembly 26 comprises a shear ring 62 and an expander collar 64. The shear ring 62 includes an inner anchor section 65a sized to fit within the annular groove 60, with a section 65b projecting outwardly from the neck diameter. The expander collar 64 includes a forward portion 66 having an inner diameter that closely surrounds the neck, the forward portion transitions to a shear ring larger diameter rear portion 68 at a shoulder 70. The shoulder 70 is thus approximately equivalent in height to the section 65b of the shear ring 62 extending outwardly from the neck portion 50. Stated differently, the collar has an annular recess in its rear portion shaped to receive the outer section 65b of the shear ring. The shear ring 62 is captured within the annular groove 60 by the expander collar 64.

The outer surface of the expander collar 64 includes a forward lead-up ramp 72, a bulbing ramp 74, and a rear, constant-diameter outer surface 76. Prior to installation, the lead-up ramp 72 is positioned adjacent the tail end 30 of the fastener body 22 in order to be in position to bulb the tail during installation. In a preferred form, the tail 30 includes an inner chamfer 78, having an angle approximately equal to the lead-up ramp 72 angle, to facilitate expansion thereof.

The shear ring 62 preferably has a generally rectangular cross section, which loosely fits within the annular groove 60. The annular groove 60 is preferably larger than the shear ring 62; and in one form of the invention, the annular groove 60 has an axial width or dimension that is approximately 8% larger than the axial dimension of the shear ring 62. By sizing the axial dimension of the annular groove 60 slightly larger than the axial dimension of the shear ring 62, a range of thicker shear rings may be employed with the same stem dimension.

Preferably, the shear ring 62 comprises a length of rectangular cross-section wire, suitable for wrapping around the circumference of the stem 24. Also possible is a solid machined or formed shear ring, which is swaged into the annular groove 60. However, it has been found that wrapping a wire around the stem 24 to form the shear ring 62 provides many benefits in manufacturing economy. First, as alluded to in the background of the invention, the shear ring wire can be inexpensively extruded to very uniform cross-sectional tolerances. The extruded wire can then be stored for later wrapping. Further, the actual wrapping operation around the stem 24 is a relatively straightforward and rapid procedure thus increasing productivity.

Another benefit of providing the separate wire-wrapped shear ring 62 is the capability to change the material or dimensions of the shear ring, depending on the strength or fastener characteristics desired. Thus, a number of different shear rings 62 can be wrapped around a single stem configuration to provide a variety of fasteners 20. Also, the circumferential angle of wrap of the shear ring 62 directly affects the resultant shear strength. Thus, a shear ring that is only wrapped 300° around the annular groove 60 possesses 5/6 of the shear strength of an identical shear ring wrapped 360° around the groove. Theoretically, the shear ring 62 can be wrapped anywhere from approximately 181° through 360° around the annular groove. However, because of the non-axisymmetric load distribution created by a partially wrapped shear ring 62, it is preferred that a continuous shear ring be wrapped at least 300° around the annular groove.

It is contemplated, however, that a number of short pieces of shear ring may be provided at uniformly circumferentially spaced locations around the annular groove to alter the shear strength characteristics of the fastener 20 while providing an axisymmetric load distribution. One possible configuration would be to form a crenelated or undulating wire, which can be continuously wrapped around the annular groove, with only intermittent portions around the circumference of the shear ring being loaded in shear.

In one specific embodiment, an expander collar 64 is provided for assembly around a stem 24 having a neck 50 with a diameter of approximately 0.142 inches. Therefore, the inner diameter of portion 66 of the collar 64 is approximately 0.142 inches. The diameter of portion 68 is approximately 0.166 inches, resulting in a shoulder 70 of approximately 0.012 inches in radial dimension. The axial dimension of the shear ring portion 68 is approximately 0.028 inches, which preferably corresponds to the axial dimension of the shear ring 62. Desirably, the shear ring 62 is extruded as a rectangular wire and wrapped around the annular groove 60 so that the axial dimension is equal to or greater than the radial dimension. The lead up ramp 72 of the expander collar 64 preferably forms an angle of approximately 20° with the central axis of the collar. Finally, the bulbing ramp 74 preferably forms an angle of greater than 20°, and preferably approximately 60°, with the central axis of the expander collar 64.

Advantageously, the shear ring 62 and expander collar 64 may possess a variety of hardness characteristics to alter the fastener properties. In general, the expander collar 64 is preferably softer than the fastener body 22 so as to avoid damaging the tail 30 as it is being bulbed outwardly, but it must be hard enough to accurately perform its tail expanding function. Additionally, it is desirable that the shear ring 62 be manufactured from a material softer than the expander ring 64 to allow it to deform and shear before the collar. At the same time, the shear ring should be sufficiently hard so that its anchor section will remain anchored in a relatively shallow shear ring groove. In one embodiment, the expander collar 64 has a Rockwell C hardness of 38, while the shear ring 62 has a Rockwell C hardness of 32. The relative softness of the shear ring 62 wire allows it to be deformed easily with minimum springback around the annular groove 60.

In short, the present invention greatly enhances the design flexibility by providing at least three ways to alter the fastener characteristics by simply changing the shear ring 62 used. First, the annular groove 60 of any one particular stem 24 is sized to receive a number of shear rings 62 having varying axial dimensions. As mentioned above, the shear strength of the ring is proportional to this axial dimension. Secondly, the angle of wrap of the shear ring 62 can be made less than 360° to reduce the shear strength. Finally, shear rings of various material hardnesses can be utilized with one particular stem. Moreover, the efficient and precise extrusion manufacture of the shear ring wire blanks lends itself to inexpensively producing and/or maintaining a wide variety of blanks for rapid deployment in the fastener assembly line. In accordance with the shear ring parameter adjustments, the expander ring 64 is replaceable and can be dimensionally or materially modified to alter the fastener characteristics as well.

During installation, as seen in FIGS. 2–3, the fastener 20 is inserted from the visible side through the aligned throughholes 44 in the workpieces 46, which are to be secured together. A conventional installation tool (not shown) is then employed to pull the stem 24 axially away from the workpieces 46, as indicated with the arrow 86. A reaction force, indicated by arrows 88, is applied to the anvil washer 48, which, in turn, transmits the reaction force to the head 28 of the fastener body 22. As the stem 24 is pulled through the fastener body 22, the interaction of the annular groove 60, shear ring 62, and shear shoulder 70 causes the expander collar 64 to wedge the tapered lead-up ramp 72 into the tail 30, radially expanding and bulbing the fastener body 22 on the blind side of the workpieces 46, as seen in FIG. 2.

The expander collar 64 is prevented from axial movement to the left relative to the stem 24 due to the interference of the shear shoulder 70 with the outwardly projecting portion 65b of the shear ring 62. The shear ring 62, in turn, is retained against the left or rear wall 90 of the annular groove 60, and thus is placed in shear through its approximate midpoint. The strength of the ring 62 in shear as described, is proportional to a cylindrical cross-sectional area defined by the product of the axial dimension of the shear ring multiplied by the circumference of the neck portion 50, at which location shearing occurs, if the shear ring is completely wrapped around the annular groove 60. However, as will be explained below, the shear ring 62 may be only partially wrapped around the annular groove to alter the shear strength. It can be seen that the strength of the shear ring is directly proportional to its axial dimension, the diameter of the neck 50 and the angle of wrap.

Eventually, as the expander collar 64 and shear ring 62 continue bulbing the fastener body 22, the expander collar encounters the workpieces 46 through the fastener body. At this point, the load on the stem increases as the expander collar 64 prevents any further movement. When the tension in the stem 24 reaches a predetermined value, the outward section 65b and the inner anchor section 65a of the shear ring 62 separate. Still retained within the annular groove 60, the inner anchor section 65a continues moving with the stem 24 into a final position shown in FIG. 3.

After separation of the shear ring 62, continued pulling of the stem 24 causes the stem to slide within the outer section 65b until the lock ring 58 meets the anvil washer 48. The lock ring 58 compresses against the shoulder 54, and the leading edge of the lock ring deforms into the recess 34, as shown in FIG. 3, thereby locking the fastener within the workpieces. Because the anvil washer 48 and the lock ring 52 react against the stem shoulder 54 to prevent further withdrawing movement of the stem 24, the tension on the stem increases, causing it to break along the break groove 56.

The formation of the bulb on the blind side of the fastener body 22 draws the workpieces 46 together. Also, as this is occurring, the neck portion 50 starts to enter the smaller inner bore 32b of the sleeve, causing radial expansion thereof to fill the hole between the fastener body 22 and the workpiece holes 44. While the lock ring 58 has been moving in the reduced diameter bore 32b, it is dimensioned to slide easily therewithin and not produce an outward force on the fastener body 22 during that stage of the installation.

While the fastener illustrated in FIGS. 1-3 has some range of workpiece thickness which can be accommodated, fasteners are usually provided in a series of different lengths. With the construction shown, fasteners of different axial length can be readily provided for workpieces of different thicknesses. The length of the installation stroke desirably remains essentially the same for each of the various sizes, as correspondingly does the distance between the annular shear ring groove 60 and the stem head 42. The variation in stem length preferably occurs in the dimension between the annular groove 60 and the shoulder 54 of the locking groove 52. This dimension can, in one extreme, be zero so that the annular groove is adjacent the locking groove 52, thus causing the lock ring 58 to be compressed between the inner shear ring section 65a and the anvil washer 48 during installation. Varying the length of the fastener at this location is important in that it helps keep the length of the blind side protrusion of the stem 24 constant, which is significant in situations of limited space availability. Further, keeping the setting stroke constant simplifies installation.

FIG. 4 illustrates the fastener 20 installed to secure two larger workpieces 102a, 102b together. The workpieces 102 are thicker than the workpieces 48 in FIGS. 1-3 thus illustrating the maximum grip range of the present fastener 20. At the maximum grip, the stem head 42 abuts the expander collar 64 and outer section 65b of the shear ring at approximately the same time the stem is severed at the break groove 56.

FIG. 1b illustrates an alternative arrangement wherein an expander collar 164 does not surround the shear ring 62. The collar 164 thus includes a forward bulbing portion 66 as with collar 64 of FIG. 1a, but does not include a rear portion analogous to portion 68 of collar 64.

The blind fasteners illustrated have manufacturing advantages over a stem with an integral shear ring. The stem can, after an initial heading step, be formed by a rolling process in which the stem material is displaced by a roller. No machining is required. Of course, the stem can also be machined in a conventional manner. There would be not much material wasted even with a machined approach since there is no integral shear ring. Having formed the stem, the shear ring is then wrapped or otherwise assembled within the annular groove on the stem neck, and the expander collar fitted is slid onto the stem to fit over the shear ring. As a final step, the fastener body is slid over the serrated end of the stem so that it frictionally engages a portion of the neck.

Other modifications and alternative embodiments of the invention will be apparent to those skilled in the art in view of the foregoing description. Accordingly, this description is to be construed as illustrative only, and is for the purpose of teaching those skilled in the art the best mode of carrying out the invention. The details of the structure may be varied substantially without departing from the spirit of the invention, and the exclusive use of all modifications which come within the scope of the appended claims is reserved.

What is claimed is:

1. A blind fastener, comprising:
   a tubular fastener body having a head and a tail, said body being adapted for insertion through aligned apertures in a plurality of workpieces;
   an elongate stem extending through said fastener body having an annular shear ring groove in the exterior of said stem adjacent said tail;
   a shear ring separate from said stem and surrounding said stem, said shear ring having an inner anchor section in said groove and an outer shear section extending radially outwardly from the outer diameter of the stem adjacent said groove; and
   an expander collar surrounding said stem and including a portion between said tail and a forward surface of said ring outer shear section, said collar being formed to expand said tail as the portion of said stem adjacent said collar is pulled into said fastener body to expand the tail of the fastener body.

2. The fastener of claim 1, wherein said collar includes a portion surrounding said ring to confine said ring in said shear ring groove.

3. The fastener of claim 1, wherein said collar includes a forward portion that is tapered or ramped outwardly and rearwardly from a smaller diameter forward portion to a larger diameter cylindrical portion that is larger than said ring, said collar further including an annular recess sized to fit around said shear ring outer section.

4. The fastener of claim 1, wherein said collar forward portion has an inner diameter close to the outer diameter of said stem adjacent said shear ring groove, and said ring has an outer diameter that is substantially greater than the outer diameter of said collar forward portion.

5. The fastener of claim 1, wherein said collar is formed as a continuous annular member.

6. The fastener of claim 1, wherein said shear ring is in the form of a wire that is wrapped around said stem and into said groove.

7. The fastener of claim 1, wherein said shear ring extends circumferentially for at least 300 degrees.

8. The fastener of claim 1, wherein said shear ring extends approximately 360 degrees.

9. The fastener of claim 1, wherein said fastener body includes a cylindrical neck that fits closely within the body tail, a stem mid-section extending forwardly from said neck, said mid-section having a diameter smaller than said neck, and a shoulder formed at the intersection of said mid-section and said neck; said annular groove being formed in said neck and being located adjacent to the axial end of said fastener body tail.

10. The fastener of claim 1, wherein said annular groove has a generally rectangular cross section and said shear ring has a generally rectangular cross section.

11. The fastener of claim 10, wherein the axial width of said groove is sufficient to accommodate various rings having a predetermined range of the axial dimension of the shear ring anchor section so as to provide a predetermined desired range of tension loads on said stem at which said collar will shear the outer section of said shear ring.

12. The fastener of claim 1, wherein the radial dimension of said shear ring anchor section is about equal to the radial dimension of said outer section of said shear ring.

13. The fastener of claim 1, wherein said collar terminates at said shear ring.

14. A blind fastener comprising:
a tubular fastener body having a head and a tail, said body being adapted for insertion through aligned apertures in a plurality of workpieces;
an elongate stem extending through said fastener body and having a cylindrical neck that fits closely within the body tail, a stem mid-section extending forwardly from said neck, said stem mid-section having a diameter smaller than said neck, and a shoulder formed at the intersection of said mid-section and said neck, and said stem having an annular shear ring groove in the exterior of said neck adjacent said tail, said groove having a generally rectangular cross section;
a shear ring separate from said stem and surrounding said stem neck, said shear ring having a generally rectangular cross section and including an inner anchor section in said groove and an outer shear section extending radially outwardly from the outer diameter of the portion of said neck adjacent said groove; and
an expander collar formed as a continuous circular member surrounding said stem, said collar including a cylindrical portion that closely surrounds said shear ring, said collar further including a forward portion having a cylindrical inner surface with an inner diameter smaller than the inner diameter of the collar portion surrounding said ring, whereby a shoulder is formed at the intersection of the rear of said collar forward portion and the collar portion surrounding said shear ring so that said shoulder engages said outer section of said shear ring, said collar having a rear axial end with an inner diameter larger than the outer diameter of said shear ring so that said collar may be slid rearwardly on said stem to surround said ring to cause said shoulder to engage said ring, said collar forward portion having an outer surface that is tapered or ramped outwardly and rearwardly from a smaller diameter end to a larger diameter portion which is larger than the outer diameter of said ring, said tapered end or ramped surface being positioned to engage said fastener body tail to expand said tail as the portion of said stem adjacent said collar is pulled into said fastener body.

15. A method of making a blind fastener, comprising:
providing a tubular fastener body having a head and a tail, with said body tail being adapted for insertion through aligned apertures in a plurality of workpieces;
providing an elongate stem for extending through said fastener body;
forming an annular groove in a rearward portion of said stem;
positioning an anchor portion of a shear ring in said groove with a shear portion of said ring extending outwardly beyond the diameter of said stem adjacent said groove;
positioning a collar on the forward end of said stem and sliding the collar rearwardly into a position where said collar engages said shear ring; and
inserting a forward portion of said stem into said fastener body tail to a position wherein a forward bulbing surface of said collar engages the rear of said tail and a forward end of said stem extends beyond said fastener body head so that said stem may be pulled with respect to said head to cause said collar to expand said tail and to shear said shear ring outer section from said anchor section after said fastener body tail has been expanded and a predetermined load on said stem is reached.

16. A method of making a blind fastener, comprising:
providing a tubular fastener body adapted for insertion through aligned apertures in a plurality of workpieces;
providing an elongated stem for extending through the fastener body;
forming an annular groove in the stem;
positioning an inner anchor section of a shear ring in said groove with an outer section of said ring extending radially outwardly from the stem; and
positioning an annular collar on said stem with a rear surface of said collar engaging a forward surface of said shear ring outer section, the collar being tapered on its outer forward portion so that it will expand the tail of the tubular fastener body upon pulling the portion of the stem carrying said shear ring into said tubular body.

17. The method of claim 16, wherein said collar positioning step includes circumferentially enclosing said shear ring with a portion of said collar so that said shear ring cannot expand radially and will shear at a predetermined tension load on said stem.

* * * * *